United States Patent Office 2,735,855
Patented Feb. 21, 1956

2,735,855

PROCESS FOR PRODUCING Δ⁴-PREGNEN-11α,21-DIOL-3,20-DIONES AND INTERMEDIATE THEREFOR

Carl Djerassi, Birmingham, Mich., and George Rosenkranz, Mexico City, Mexico, assignors to American Syntex Incorporated, Hato Rey, Puerto Rico, a corporation of Puerto Rico No Drawing. Application March 6, 1953,
Serial No. 340,898

Claims priority, application Mexico March 7, 1952

4 Claims. (Cl. 260—397.45)

The present invention relates to novel cyclopentanophenanthrene derivatives and to a method for the preparation thereof.

More particularly, the present invention relates to ring A unsaturated compounds of the pregnene and allopregnene series having 11α and 21-hydroxy groups and 3 and 20-keto groups, as well as to esters thereof.

In accordance with the present invention, it has been discovered that allopregnan-11α,21-diol-3,20-dione and its esters may be converted into the novel Δ¹-allopregnen-11α,21-diol-3,20-dione and esters thereof, the corresponding Δ¹,⁴-isomers and the corresponding Δ⁴-pregnen compounds. In accordance with the present invention, there has been further discovered that the aforementioned starting materials may be converted into certain novel bromo compounds as well as other certain novel intermediates for the production of the final compounds referred to.

The final products of the present novel process just referred to have therapeutic hormone activity, especially of the type characterizing the adrenal cortical steroids. Further, since the 11α-hydroxy group of these final compounds may be readily oxidized with chromic acid, for example, they are also intermediates for the production of corresponding ring A unsaturated pregnane compounds such as 11-dehydro corticosterone.

The following equation serves to illustrate a portion of the present invention:

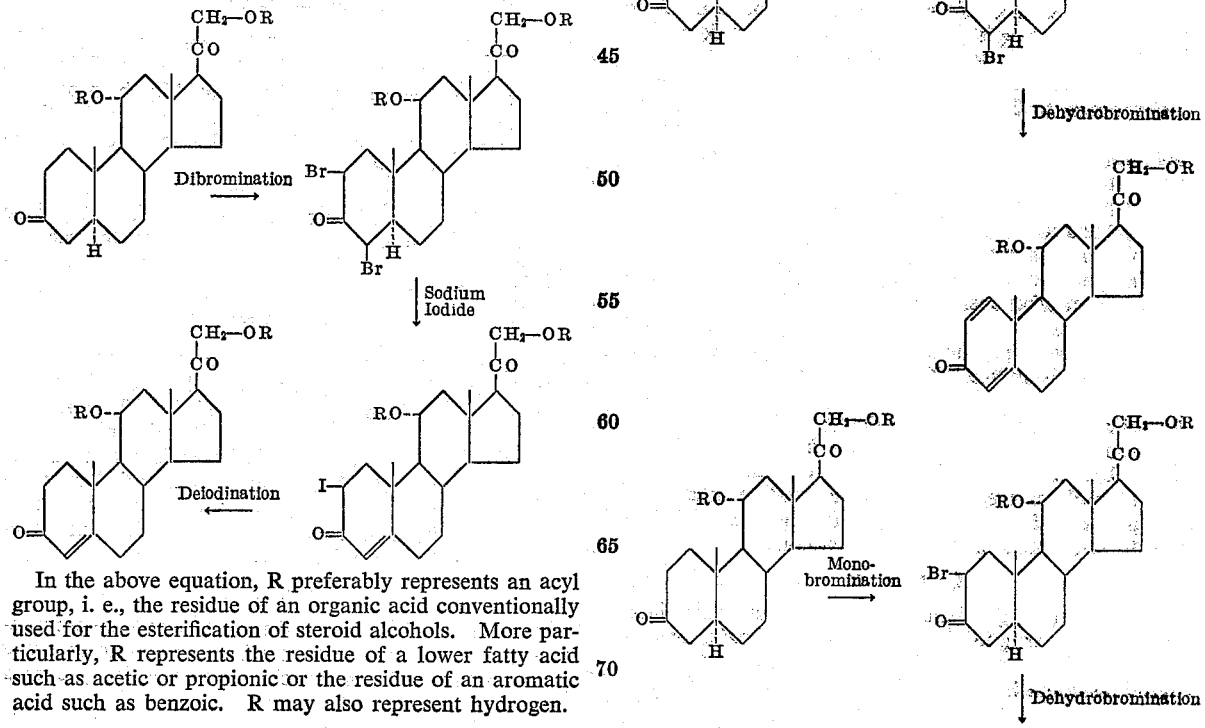

In the above equation, R preferably represents an acyl group, i. e., the residue of an organic acid conventionally used for the esterification of steroid alcohols. More particularly, R represents the residue of a lower fatty acid such as acetic or propionic or the residue of an aromatic acid such as benzoic. R may also represent hydrogen.

In practicing the process above outlined an 11,21-diester of allopregnan-11α,21-diol-3,20-dione prepared in accordance with our United States application, Serial Number 335,585, filed February 6, 1953, dissolved in a suitable solvent such as glacial acetic acid, is treated with two molar equivalents of bromine in acetic acid in the presence of a catalytic amount of hydrogen bromide. Preferably, during the addition of the bromine in acetic acid, which took approximately 15 minutes, the temperature of the mixture is kept at room temperature. After standing for a suitable length of time, in order to complete the rearrangement of the 2,2'-dibromo compound first formed into the more stable 2,4-dibromo derivative, the solution is diluted with water and the precipitate suitably purified.

The 2,4-dibromo derivative thus produced is then treated with sodium iodide in the presence of a lower aliphatic ketone solvent or with an equivalent alkali metal iodide to prepare the corresponding 2-iodo-Δ⁴-compound. The 2-iodo-Δ⁴-compound is then subjected to treatment with a deiodinating agent, as for example, chromous chloride, sodium bisulfite, collidine or a tertiary amine such as dimethylaniline. The resultant 11,21-diester of Δ⁴-pregnen-11α,21-diol-3,20-dione was then readily converted into the free compound by conventional saponification. Mild esterification (-10° C.) with approximately one mol of an esterifying agent, such as acetic anhydride, gave the corresponding 21-monoester.

The brominated derivatives of allopregnan-11α,17α-diol-3,20-dione and/or its esters, may be utilized for the production of novel ring A unsaturated steroids such as the corresponding Δ¹ and Δ¹,⁴-derivatives, in accordance with the following equations:

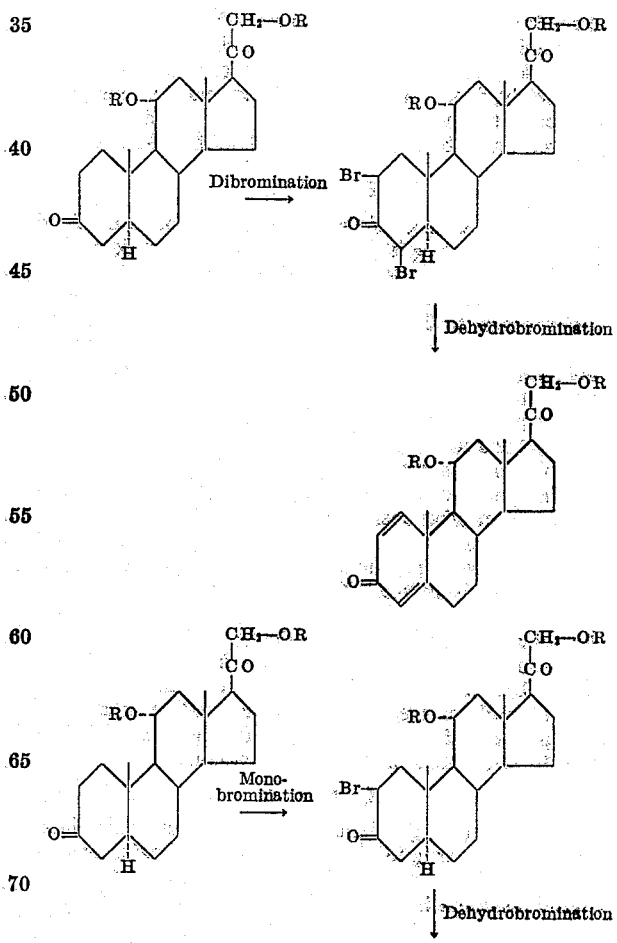

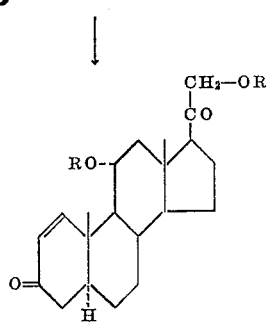

In the above equations, R represents the same groups as heretofore set forth.

In proceeding in accordance with the above equations, the starting material which may be a suitable ester, such as the 11,21-diacetate of allopregnan-11α,21-diol-3,20-dione is treated either with one molar equivalent of bromine or two molar equivalents, depending upon whether the 2-bromo derivative is desired or the 2,4-dibromo derivative. Thereafter, these bromo derivatives are subjected to dehydrobromination by treatment with the dehydrobrominating agent, i. e., a tertiary amine, such as lutidine or collidine, or by formation of the corresponding dinitrophenylhydrazone or semicarbazone which is thereafter subjected to cleavage with a suitable agent such as pyruvic acid. The corresponding free compounds and 21-monoesters can then be produced by the same procedure as previously set forth in connection with the $\Delta^4$-compound.

The following specific examples serve to illustrate, but are not intended to limit the present invention:

*Example I*

A solution of 1 g. of allopregnan-11α,21-diol-3,20-dione diacetate in 60 cc. of glacial acetic acid was mixed with three drops of a 4-normal solution of hydrogen bromide in acetic acid and then a solution of 1.05 molar equivalents of bromine in acetic acid was added dropwise and under mechanical stirring. After the solution had decolorized completely, it was diluted with water and the precipitate was collected, washed with water and air dried. The product was 2-bromo-allopregnan-11α,21-diol-3,20-dione.

*Example II*

A solution of 1 g. of the 2-bromo compound obtained according to Example I, in 7 cc. of gamma-collidine was refluxed for 45 minutes. The cooled mixture was filtered from the collidine hydrobromide formed (its weight corresponded to 0.97 molar equivalents), the precipitate was washed with ether and the filtrate was diluted with more ether, washed with dilute hydrochloric acid, sodium carbonate solution and water, dried over sodium sulphate and evaporated to dryness. In order to purify the compound, it was dissolved in a mixture of benzenehexane and the solution was passed through a column with 3 g. of alumina previously washed with ethyl acetate. Recrystallization from ethel acetate yielded $\Delta^1$-allopregnen-11α,21-diol-3,20-dione.

In the above experiment, gamma-collidine can be substituted by 2,6-lutidine with the same results.

Saponification of the diacetate by refluxing with 1% ethanolic potassium hydroxide during 1 hour and working up in the usual way afforded the free $\Delta^1$-allopregnen-11α,21-diol-3,20-dione. Acetylation of this compound with 1.1 mols of acetic anhydride in pyridine solution at a temperature of −10° C., during 2 days gave $\Delta^1$-allopregnen-11α,21-diol-3,20-dione 21-monoacetate.

*Example III*

A solution of 1 g. of the 2-bromo compound obtained according to Example I, 0.75 g. of semicarbazide hydrochloride and 0.8 g. of sodium acetate trihydrate (previously dissolved in 0.5 cc. of water) in 150 cc. of acetic acid was heated for 2 hours at a temperature of 60° C., under atmosphere of nitrogen. After this time, 10 cc. of pyruvic acid, 3 g. of sodium acetate and 20 cc. of water were added and the temperature of the mixture was raised to 75° C. After 2 hours, 4 additional cc. of pyruvic acid were added and the mixture was kept standing overnight. Next day it was diluted with much water and the precipitate was extracted with chloroform, washed with sodium bicarbonate and water, dried over sodium sulphate and evaporated to dryness, thus giving $\Delta^1$-allopregnen-11α,21-diol-3,20-dione diacetate identical to the one obtained according to Example II.

*Example IV*

A solution of 2 g. of the 2-bromo derivative obtained according to Example I and 1.1 molar equivalents of 2,4-dinitrophenylhydrazine in 50 cc. of glacial acetic acid was heated at 100° C., for 5 minutes, the mixture was cooled and the crystals of the orange dinitrophenylhydrazone formed were collected and washed with alcohol. 1 g. of this compound was dissolved in 50 cc. of chloroform and then mixed with 75 cc. of 85% pyruvic acid and 6 cc. of a 4-normal solution of hydrogen bromide in acetic acid. After heating for 3 hours at 60° C., under atmosphere of nitrogen, the mixture was diluted with chloroform and the chloroform layer was washed with water, sodium carbonate solution and water, dried over sodium sulphate and evaporated to dryness. After one crystallization from ethyl acetate, $\Delta^1$-allopregnen-11α,21-diol-3,20-dione diacetate was obtained, identical to the one obtained according to Example II.

*Example V*

A solution of 2 g. of allopregnan-11α,21-diol-3,20-dione diacetate in 100 cc. of glacial acetic acid containing 5 drops of a 4-normal solution of hydrogen bromide in acetic acid was treated dropwise at 20° C., under mechanical stirring with a solution of 2 molar equivalents of bromine in 5 cc. of glacial acetic acid which was added in a period of 15 minutes. 1 additional cc. of the hydrogen bromide solution was added and the solution was kept overnight at room temperature in order to complete the rearrangement of the 2,2'-dibromo configuration into the more stable 2,4-dibromo configuration. Next day the mixture was diluted with water and the precipitate of 2,4-dibromo-allopregnan-11α,21-diol-3,20-dione was collected, washed and air dried.

*Example VI*

A solution of 1 g. of the 2,4-dibromo compound obtained according to Example V, in 8 cc. of collidine was refluxed for 40 minutes and then treated by the procedure described in Example II. After one crystallization from ethyl acetate, $\Delta^{1,4}$-pregnadien-11α,21-diol-3,20-dione diacetate was obtained.

Saponification by the method described in Example II yielded the free $\Delta^{1,4}$-pregnadien-11α,21-diol-3,20-dione and monoacetylation of this compound by the method described in Example II gave $\Delta^{1,4}$-pregnadien-11α,21-diol-3,20 dione 21-monoacetate.

*Example VII*

A solution of 3 g. of the 2,4-dibromo compound obtained according to Example V, in 100 cc. of acetone (or methylethyl-ketone) was refluxed for 20 hours with 3.3 g. of sodium iodide. After cooling, the mixture was diluted with ether and washed with sodium thiosulphate solution, sodium bicarbonate and water, dried over sodium sulphate and evaporated to dryness under reduced pressure, leaving as a residue the crude 2-iodo-$\Delta^4$-pregnen-11α,21-diol-3,20-dione diacetate.

*Example VIII*

A solution of 1.5 g. of the crude 2-iodo-$\Delta^4$-pregnen-11α,21-diol-3,20-dione diacetate in 200 cc. of acetone was mixed with a solution of chromous chloride prepared from 11 g. of chromic chloride by the method described by Rosenkranz, Mancera, Gatica and Djerassi, J. Am. Chem., Soc., 72, 4077 (1950). After 15 minutes at room temperature, the solution was diluted with water and the product was extracted with ether, washed with sodium bicarbonate and water, dried over sodium sulphate and concentrated to a small volume until the product started to crystallize. After cooling the solution, the product was collected and recrystallized from hexane-acetone to give $\Delta^4$-pregnen-11α,21-diol-3,20-dione diacetate with a melting point of 148°–150 C., $/\alpha/_D+158°$ (chloroform).

Saponification by the method described in Example II afforded the free $\Delta^4$-pregnen-11α,21-diol-3,20-dione and monoacetylation of this compound according to the method described in Example II gave $\Delta^4$-pregnen-11α,-21-diol-3,20-dione 21-monoacetate.

*Example IX*

1 g. of the iodo compound obtained according to Example VII was refluxed with 10 cc. of collidine for 30 minutes and the cooled mixture was diluted with ether and washed with dilute hydrochloric acid, sodium carbonate and water, dried over sodium sulphate and evaporated to dryness. The same product was thus obtained, as the one described in Example VIII. In this reaction collidine can be substituted by 2,6-lutidine or dimethylaniline.

We claim:

1. A process for the production of a compound selected from the class consisting of $\Delta^4$-pregnen-11α,21-diol-3,20-dione, lower fatty acid esters thereof and benzoic acid esters thereof which comprises treating a compound selected from the class consisting of allopregnan-11α,21-diol-3,20-dione, lower fatty acid esters thereof and benzoic acid esters thereof with approximately 2 molar equivalents of bromine to form a 2,4-dibromo derivative, treating said dibromo derivative with an alkali metal iodide in the presence of a lower aliphatic ketone to form the corresponding 2-iodo-$\Delta^4$-compound and then treating the 2-iodo-$\Delta^4$-compound with a deiodinating agent.

2. The process of claim 1, wherein the deiodinating agent is selected from the group consisting of chromous chloride, sodium bisulfite, a tertiary amine and Raney nickel.

3. The process of claim 1, wherein the product is $\Delta^4$-pregnen-11α,21-diol-3,20-dione 11,21-diacetate and the starting compound is allopregnan-11α,21-diol-3,20-dione 11,21-diacetate.

4. 2,4-dibromo-allopregnan-11α,21-diol-3,20-dione diacetate.

References Cited in the file of this patent

UNITED STATES PATENTS 2,602,769    Murray et al. ............ July 8, 1952